United States Patent Office 3,033,816
Patented May 8, 1962

3,033,816
PRODUCTION OF GLYCIDYL ETHER COMPOSITIONS
Herbert P. Price and William J. Belanger, both % Devoe & Raynolds Company, P.O. Box 328, Louisville 1, Ky.
No Drawing. Filed Oct. 3, 1958, Ser. No. 765,018
6 Claims. (Cl. 260—47)

This invention relates to improvements in the production of glycidyl ether compositions, and includes new processes of producing such compositions and improved compositions resulting therefrom.

The process of the present invention is one in which chlorohydrin ethers of aliphatic alcohols are first formed and are then admixed with a polyhydric phenol or with a chlorohydrin ether of a polyhydric phenol, and subjected to dehydrohalogenation with an alkaline dehydrohalogenating agent, particularly caustic alkali, in the presence of an excess of epichlorohydrin as a solvent, or as a solvent and reaction medium, to produce a composite glycidyl ether composition containing glycidyl ethers of both the aliphatic alcohol and of the polyhydric phenol. The amount of alkali used is sufficient to effect dehydrohalogenation of the chlorohydrin ether of the alcohol, and of the chlorohydrin ether of the dihydric phenol when used, and also to bring about reaction of part of the excess epichlorohydrin with the polyhydric phenol, when used, to produce glycidyl ethers thereof.

In our prior application entitled "Production of Glycidyl Ethers, Etc.," we have described the production of chlorohydrin ethers of aliphatic alcohols and their dehydrohalogenation with an alkaline dehydrohalogenating agent in the presence of an excess of epichlorohydrin as a solvent and reaction medium to produce glycidyl ethers of the alcohols.

The process of the present application is a modification of and improvement upon the process of said companion application, in which polyhydric phenols, and particularly dihydric phenols, or chlorhydrin ethers of such phenols, or mixtures of such phenols and chlorohydrin ethers, are admixed with the chlorohydrin ethers of the alcohols to produce, on dehydrohalogenation, composite glycidyl ethers which are in part glycidyl ethers of the aliphatic alcohols and in part glycidyl ethers of the polyhydric phenols.

The process will be first described in connection with the addition of a dihydric phenol to the chlorohydrin ethers of the alcohols.

In this process, a part of the excess epichlorohydrin is caused to react with the added polyhydric phenol to form glycidyl ethers thereof, in the presence of excess epichlorohydrin, at the same time that the chlorohydrin ethers of the aliphatic alcohols are converted to glycidyl derivatives of these alcohols.

The production of the chlorohydrin ether of the alcohol is a preliminary step which precedes the admixture therewith of the polyhydric phenol and the carrying out of the dehydrohalogenation in the presence of excess epichlorohydrin; or this step can be considered the first step of the process.

In producing the chlorohydrin ethers of the alcohols, a monohydric alcohol, or a polyhydric alcohol, is reacted with epichlorohydrin in the presence of a condensation catalyst to form the corresponding chlorohydrin ether and with substantially complete reaction of the epichlorohydrin used to produce such ether. The process will differ somewhat, and the results will also differ, depending upon whether a monohydric alcohol is used or a polyhydric alcohol, and depending also, in the case of a polyhydric alcohol, on whether all of the hydroxyl groups are reacted to form chlorohydrin ether groups or only part of them are so reacted.

When a monohydric alcohol is used, only a monochlorohydrin ether will be formed. When a dihydric alcohol is used, the chlorohydrin ether formed may be a monochlorohydrin ether or a dichlorohydrin ether or mixtures thereof, depending upon the proportions of epichlorohydrin used. Where the polyhydric alcohol employed contains more than two hydroxyl groups, at least one of the hydroxyl groups will be reacted to form the chlorohydrin ether group; and the number of chlorohydrin ether groups can increase from one up to and including all of the hydroxyl groups contained in the particular polyhydric alcohol used. Thus, in the case of a trihydric alcohol, the trichlorohydrin ether can be formed, or the partial monochlorohydrin ether, or the dichlorohydrin ether, as well as mixtures.

The reaction of the alcohol with the epichlorohydrin is advantageously carried out with the use of a condensation catalyst of the $BF_3$ type, and particularly the use of a $BF_3$ catalyst such as a boron trifluoride ether complex or etherate. This reaction is an addition reaction between the epoxy group of the epichlorohydrin and the hydroxyl group or groups of the alcohol. In this reaction, no excess of epichlorohydrin is necessary in the formation of the chlorohydrin ether or ethers and all or substantially all of the epichlorohydrin initially added to the alcohol is caused to react therewith.

After the formation of the chlorohydrin ethers, the boron fluoride catalyst is killed or deactivated by the use of minute amounts of alkali and water.

The chlorohydrin ethers of the alcohols, which are subjected to dehydrohalogenation in admixture with the added polyhydric phenol and excess epichlorohydrin, thus include monochlorohydrin ethers of monohydric alcohols, the monochlorohydrin ethers of dihydric alcohols, the dichlorohydrin ethers of dihydric alcohols, the mono- or dichlorohydrin ethers of trihydric alcohols, or other polyhydric alcohols.

An advantageous method of carrying out the process, and of producing composite diglycidyl ethers, is one in which a dichlorohydrin ether of a dihydric alcohol is used with a dihydric phenol, such as bisphenol or resorcinol, etc., with the resulting production, as a result of the dehydrohalogenation and reaction in the presence of excess epichlorohydrin, of a composite or mixed product or composition made up largely of diglycidyl ethers of the dihydric alcohol and of the dihydric phenol.

The phenols which are added to the chlorohydrin ethers before dehydrohalogenation are advantageously dihydric phenols, but the process in its broader aspects includes monohydric phenols which are converted into monoglycidyl ethers and higher polyhydric phenols.

In carrying out the principal step of the process, epichlorohydrin is used in excess with the chlorohydrin ether of the alcohol and with the phenol, the excess being an amount which is at least 1 mol of epichlorohydrin for each mol present in the chlorohydrin ether and for each mol which reacts with the phenol; and advantageously a much larger proportion of epichlorohydrin is used. Up to as much as 10–20 mols of epichlorohydrin can be used.

In carrying out the process, there is added to the mixture of chlorohydrin ether, phenol and excess epichlorohydrin, a dehydrohalogenating agent, advantageously caustic alkali. The amount of alkali used is based on the amount required to convert the chlorohydrin ether into the glycide ether and to react with the phenol and part of the epichlorohydrin to form the glycidyl ether of the phenol, with a small excess over this amount, e.g., around a 10% molar excess. The excess epichlorohydrin added and present during the dehydrohalogenation and reaction acts as a solvent or diluent or reaction medium and does not enter into reaction to any notable extent.

The final step of the process is one in which the glycidyl ether mixture formed is separated from the excess epichlorohydrin and byproduct salt.

Different alkaline dehydrohalogenating agents can be used, including alkali metal complexes and salts such as sodium silicate, sodium aluminate, sodium zincate, etc. But it is one advantage of the present process, in which epichlorohydrin is used as a solvent or diluent, that caustic alkali can be used for the dehydrohalogenation without objectionable further reaction or with a minimum of further reaction during or after the formation of the glycidyl ethers. The use of epichlorohydrin as a solvent and caustic alkali as a dehydrohalogenating agent enables the glycide ethers to be produced largely in a monomeric state and with a minimum or limited amount of further reaction or condensation or polymerization during the dehydrohalogenation.

The monohydric alcohols which are used and converted into chlorohydrin ethers include monohydric alcohols such as ethyl, propyl and butyl alcohols, etc., or higher alcohols such as lauryl or soya alcohols, etc. The polyhydric alcohols include glycols and polyglycols containing at least two hydroxyl groups, at least one of which is a primary hydroxyl group, polyhydric alcohols containing more than two hydroxyl groups, such as trimethylolethane, trimethylolpropane, pentaerythritol, etc. Polyhydric alcohols having a hydrocarbon chain between the two hydroxyl groups are advantageous in imparting an aliphatic hydrocarbon element into the glycide ether formed therefrom. Among such alcohols are ethylene glycol, butane diol, pentane diol, diethylene glycol, triethylene glycol, hexane triol, glycerol and various polyethylene glycols and polypropylene glycols, etc.

The polyhydric alcohols which can be used also include dihydroxy alkyl ethers of dihydric phenols, e.g., the dihydroxyethyl ethers of bis-phenol, resorcinol, etc.

Where polyhydric alcohols are used with two or more than two hydroxyl groups, the chlorohydrin ethers may be partial ethers prepared by using an amount of epichlorohydrin insufficient to react with all of the hydroxyls. Thus, a monochlorohydrin ether or a dichlorohydrin ether of a trihydric alcohol can be produced, which still contains reactive hydroxyl groups.

The use of an excess of epichlorohydrin serves a double purpose in the process. Part of the excess reacts with the dihydric phenol or polyhydric phenol under the action of the dehydrohalogenating agent to form glycidyl ethers, while the excess of epichlorohydrin serves as a solvent or reaction medium and serves to control the reaction so that the products formed are largely monomeric glycide ethers of the alcohol and phenol.

To some extent, the phenol may react with the chlorohydrin ether or with the glycide ether produced therefrom to form more complex reaction products containing both the aromatic phenol residues and the aliphatic alcohol residues. But it is one advantage of the use of a large excess of epichlorohydrin that the formation of such complex and high molecular weight resins takes place only to a limited extent. Smaller excesses of epichlorohydrin may tend to increase the formation of such complex resinous products, but larger amounts tend to decrease their formation and give largely monomeric glycidyl ethers of the alcohols and phenols.

The proportions as well as the nature of the chlorohydrin ethers of the alcohols and of the added phenols can be varied, with resulting variation in the proportions and nature of the aliphatic and aromatic glycidyl ethers formed. Mixtures of monochlorohydrin ethers of monohydric alcohols and of monohydric phenols will give a mixture made up largely of the monomeric glycidyl ethers. Mixtures of dichlorohydrin ethers of dihydric alcohols and dihydric phenols will give composite products which are largely diglycide ethers.

In the chlorohydrin ethers which are formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1)   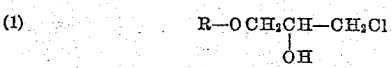

This compound is easily dehydrohalogenated to give an epoxide compound.

Inactive chlorines are formed by the addition of epichlorohydrin to the hydroxyl group in the above compound.

(2)   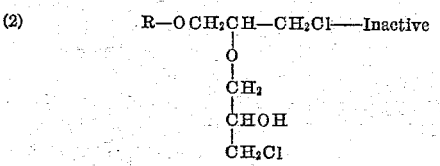

The above labeled chlorine cannot be removed to form an epoxide group since no hydroxyl is present on an adjacent carbon.

The following description and examples further illustrate the invention, but it will be understood that the invention is not limited thereto.

Resins of a wide vicosity range can be prepared by varying the proportions of aliphatic chlorohydrin and dihydric phenol, as illustrated by the following examples and table. Proportions containing 25% or less of the glycidyl ether of the polyhydric alcohol and 75% or more of the diglycidyl ether of the dihydric phenol are advantageous from the standpoint of physical properties of the cured resins. Softer resins with high water absorption, where this is desired, are obtained with the use of higher percentages of the aliphatic chlorohydrin and the production of correspondingly higher proportions of the aliphatic glycide ethers.

The examples illustrate the use of varying amounts of excess epichlorohydrin. Resins of somewhat higher viscosities are obtained with the lower ratios of excess epichlorohydrin, indicating that somewhat more complex reactions take place to some extent to produce somewhat more complex reaction products than the simple glycide ethers of the alcohol and phenol. Nevertheless, clear, low viscosity resins can be prepared by this method with smaller excesses of epichlorohydrin.

Mixed glycidyl ethers have been prepared over a range of proportions of 90% to 10% of the glycidyl ether, such as the diglycidyl ether, of aliphatic polyhydric alcohols, to from 10% to 90% of the diglycidyl ethers of the dihydric phenols, these ratios being calculated on the theoretical glycidyl ethers in the finished product, on the assumption that the chlorohydrin is dehydrohalogenated to the glycidyl ether of the polyhydric alcohol and the dihydric phenol reacts with some excess epichlorohydrin to form the diglycidyl ether of the dihydric phenol; although actually the reaction may be somewhat more complex with the production of small or varying amounts of more complex reaction products.

EXAMPLE 1

To a one liter flask equipped with stirrer, condenser, thermometer and inlet tube was added 186 grams (3 mols) of ethylene glycol and 1 cc. $BF_3$ etherate. The temperature was raised to 70° C. where 555 grams of epichlorohydrin (6 mols) was added dropwise over a period of three hours. The temperature was controlled between 60–70° C. by rate of epichlorohydrin addition and by external cooling. After all the epichlorohydrin had been added, the temperature was raised to 100° C. to insure complete reaction. The product contained 23.2% active chlorine, 28.8% total chlorine.

To a two liter flask equipped as above was added 247 grams of the above dichlorohydrin ether and 114 grams of bis-phenol. One gram of NaOH in 5 cc. of water was added to destroy the $BF_3$ catalyst, followed by addition of 648 grams of epichlorohydrin. When solution was attained, 132 grams of NaOH (equivalence+10 wt. percent excess) was added in 4 increments over a 40 minute period. The temperature was controlled between 70–98° C. during these additions. After the exotherm from the final caustic addition had ended, the water-epichlorohydrin azeotrope was removed to a pot temperature of 126° C. The salt was then removed by filtration on a Buchner funnel and was washed with benzene. The solvents were removed by vacuum distillation to a pot temperature of 200° C. at 60 mm. The clear product had a weight/epoxide of 179 (theoretical 115), total chlorine 5.6%, active chlorine 1.8%, Gardner Viscosity M–N.

EXAMPLE 2

To a two liter flask equipped as in Example 1 was added 360 grams (4 mols) of butanediol and 2 cc. of $BF_3$ etherate. Eight mols (740 grams) of epichlorohydrin was added dropwise over a four hour period, the temperature being controlled between 60–75° C. by rate of epichlorohydrin addition and by external cooling. After all the epichlorohydrin had been added, the temperature was raised to 77° C. to insure complete reaction. The dichlorohydrin ether analyzed 21.0% active chlorine, 25.8% total chlorine.

To a one liter flask equipped as above was added 92 grams of the above dichlorohydrin ether and ½ gram NaOH in 5 cc. of water to destroy the $BF_3$ catalyst. Bis-phenol (135 grams) and epichlorohydrin (455 grams) were added. When all had dissolved, 81 grams of NaOH was added in three increments. The temperature was controlled between 70–98° C. during these additions. After the exotherm from the final addition had subsided, the water-epichlorohydrin azeotrope was removed to a pot temperature of 130° C. The salt was removed by filtration on a Buchner funnel and was washed with benzene. The solvents were distilled off to a pot temperature of 166° C. at 56 mm. The product had a weight/epoxide of 200 (theoretical 143), total chlorine 4.3%, active chlorine, 2.5%, Gardner Viscosity V.

EXAMPLE 3

This resin was prepared in the same manner as the one in Example 2 except 282 grams of epichlorohydrin was used. This was a molar ratio of 2 to 1 total epichlorohydrin to polyol-phenol rather than 4 to 1. The product obtained in 98% yield was clear with a weight/epoxide of 196, total chlorine 3.2, active chlorine 1.3, Gardner Viscosity X–Y.

EXAMPLE 4

To a one liter flask equipped as in Example 1 was added 318 grams (3 mols) of diethylene glycol and 1 cc. $BF_3$ etherate. Six mols (555 grams) of epichlorohydrin was added dropwise over a period of three hours, the temperature being controlled between 60 and 70° C. by rate of epichlorohydrin addition and by external cooling. The product contained 19.6% active chlorine, 24.4% total chlorine.

To a two liter flask equipped as above was added 107 grams of the above dichlorohydrin ether and 214 grams bisphenol. One gram of NaOH in 5 cc. of water was added to complex the $BF_3$ catalyst. Epichlorohydrin, 656 grams, was added. After all had dissolved, 115 grams NaOH (equivalence+10 wt. percent excess) was added in four increments, the temperature being controlled between 70–98° C. The water-epichlorohydrin azeotrope was then removed to a pot temperature of 125° C. The salt was filtered out on a Buchner funnel and washed with benzene. The solvents were distilled off to a pot temperature of 152° C. at 56 mm. The clear product was recovered in 100% yield with a weight/epoxide of 205 (theoretical 153), total chlorine 2.9%, active chlorine 1.4%, Gardner Viscosity $Z_1$–$Z_2$.

EXAMPLE 5

To a two liter flask equipped as in Example 1 was added 536 grams of trimethylol propane (4 mols). The temperature was raised to 75° C. to melt the compound and was then cooled to 60° C. One cc. of $BF_3$ etherate was added and dropwise addition of 740 grams of epichlorohydrin (8 mols) was begun and continued for three hours. The temperature was held between 60–75° C. during this addition. The product contained 19.0% active chlorine, 22.2% total chlorine.

To a two liter flask equipped as above was weighed 415 grams of the above dichlorohydrin. One gram of NaOH in 5 cc. of water was added to complex the catalyst. Resorcinol (40 grams) and epichlorohydrin (684 grams) were added. When solution was attained 134 grams NaOH (equivalence+10 wt. percent excess) was added in four increments, the temperature being held between 70–98° C. After the exotherm from the final addition had subsided, the water-epichlorohydrin azeotrope was removed to 125° C. The salts were removed by filtration on a Buchner funnel and were washed with benzene. The solvents were distilled to 170° C. at 53 mm. The clear product was recovered with a weight/epoxide of 164 (theoretical 113), total chlorine 4.4%, active chlorine 1.3%, Gardner Viscosity M–N.

The properties of the mixed diglycidyl ethers of the above examples, as well as of other ethers produced in a similar way, are listed in Table I.

In this table, the total and active chlorine of the dichlorohydrin ether are indicated in the first two columns. The third and fourth columns indicate the theoretical resin mixture produced on the assumption that the dichlorohydrin is converted to diglycide ether and the dihydric phenol to the diglycide ether, and column 4 indicates the dihydric phenol used. The column headed "Dehydrohalogenation Solvent" indicates the moles of excess epichlorohydrin per mole of glycidyl ether compound formed, a ratio of e.g. 2/1 indicating there are twice as many moles of unreacted epichlorohydrin as there are moles of product formed.

Under "Resin Analyses," the column headed "Wt./Epoxide" gives the actual weight per epoxide group, and also the theoretical weight on the assumption that the product is a mixture of diglycide ethers of the polyhydric alcohol and of the dihydric phenol. The last columns indicate the total and active chlorine content of the resins and the Gardner viscosity.

Table I
PROPERTIES OF MIXED DIGLYCIDYL ETHERS OF POLYHYDRIC ACLOHOLS AND DIHYDRIC PHENOLS

| Polyhydric Alcohol | Dichlorohydrin Ether | | Theoretical Resin Mix | | Moles Excess Epichlorohydrin per Mole DGE Formed, Epi | Resin Analyses | | | | Gardner Viscosity |
|---|---|---|---|---|---|---|---|---|---|---|
| | Active Cl, Percent | Total Cl, Percent | Wt./Percent DGE of Polyhydric Alcohol | Percent DGE of Phenol | | Wt./Epoxide | | Chlorine | | |
| | | | | | | Act. | Theo. | Percent T. | Percent A. | |
| Ethylene Glycol | 23.2 | 28.8 | 50 | 50—Bisphenol | 4/1 | 179 | 115 | 5.6 | 1.8 | M–N |
| Do | 23.2 | 28.8 | 90 | 10—Bisphenol | 4/1 | 156 | 95 | 8.2 | 1.9 | A |
| Butanediol | 23.2 | 25.8 | 50 | 50—Bisphenol | 4/1 | 182 | 127 | 2.5 | 1.1 | H |
| Do | 21.0 | 25.8 | 25 | 75—Bisphenol | 4/1 | 200 | 143 | 4.3 | 2.5 | V |
| Do | 21.0 | 25.8 | 25 | 75—Bisphenol | 2/1 | 196 | 143 | 3.2 | 1.3 | X–Y |
| Do | 20.9 | 25.8 | 40 | 60—Resorcinol | 4/1 | 152 | 107 | 4.2 | 1.8 | F |
| Do | 20.9 | 25.8 | 7.5 | 92.5—Dichloro-Bisphenol | 4/1 | 221 | 191 | 2.5 | 1.6 | >Z₆ |
| Pentanediol | 20.2 | 24.6 | 50 | 50—Bisphenol | 4/1 | 187 | 132 | 4.9 | 2.0 | F–G |
| Diethylene Glycol | 19.6 | 24.4 | 20 | 80—Bisphenol | 4/1 | 205 | 153 | 2.9 | 1.4 | Z₁–Z₂ |
| Do | 19.6 | 24.4 | 30 | 70—Bisphenol | 4/1 | 204 | 146 | 4.0 | 1.8 | W–X |
| Do | 19.6 | 24.4 | 90 | 10—Dihydroxy Benzophenone | 4/1 | 160 | 113 | 6.4 | 1.4 | |
| Triethylene Glycol | 17.6 | 21.2 | 60 | 40—Resorcinol | 4/1 | 175 | 122 | 4.3 | 1.9 | F |
| Carbowax 600 | 8.0 | 9.0 | 50 | 50—Bisphenol | 8/1 | 255 | 231 | 1.6 | 0.8 | R |
| Teracol 30 | 2.1 | 2.2 | 50 | 50—Bisphenol | 8/1 | 367 | 307 | 1.6 | 1.1 | Z₃–Z₄ |
| Trimethylol Propane [1] | 20.3 | 25.8 | 50 | 50—Bisphenol | 5/1 | 187 | 132 | 5.8 | 1.9 | W |
| Trimethylol Propane | 19.0 | 22.2 | 10 | 90—Resorcinol | 6/1 | 149 | 122 | 2.6 | 1.0 | V–W |
| Do | 19.0 | 22.2 | 80 | 20—Resorcinol | 4/1 | 164 | 113 | 4.4 | 1.3 | M–N |
| Do | 19.0 | 22.2 | 25 | 75—Bisphenol | 4/1 | 205 | 153 | 2.2 | 1.0 | Z₄ |
| Do | 19.0 | 22.2 | 25 | 75—Bisphenol | 2/1 | 214 | 153 | 2.0 | 0.8 | Z₅–Z₆ |
| Hexanetriol | 19.4 | 22.2 | 25 | 75—Bisphenol | 4/1 | 211 | 153 | 4.3 | 2.5 | V |
| Do | 19.4 | 22.2 | 25 | 75—Bisphenol | 2/1 | 224 | 153 | 2.7 | 1.4 | Z–3 |
| Do | 19.4 | 22.2 | 70 | 30—Dihydroxy Benzophenone | 4/1 | 192 | 133 | 4.8 | 2.0 | |

[1] Trichlorohydrin Ether.

DGE = Diglycidyl Ether.

The following example illustrates the production of mixed glycidyl ethers of a dihydric phenol and of a monohydric alcohol:

EXAMPLE 6

To a one liter flask equipped with stirrer, condenser, thermometer and inlet tube was added 532 g. (2 mols) of soya alcohol and 1 cc. BF₃ etherate. The temperature was raised to 65° C. when 185 g. (2 mols) of epichlorohydrin was added dropwise over a period of 1 hour. The temperature was controlled between 60–70° C. by rate of epichlorohydrin addition and by external cooling. After all the epichlorohydrin had been added, the temperature was raised to 90° C. to insure complete reaction. The product contained 8.4% active chlorine, 9.9% total chlorine.

To a 2 liter flask equipped as above was added 358.5 g. (1 mol) of the above chlorohydrin ether. One gram of NaOH in 5 cc. water was added to deactivate the BF₃ catalyst. 228 g. bisphenol (1 mol) and 832.5 g. (9 mols) of epichlorohydrin were then added. The total epichlorohydrin ratio was 10 mols to 1 mol alcohol plus one mol bisphenol. Heat was applied to dissolve the components, and at 70° C. 132 g. NaOH (3 mols+10% excess) was added in 3 increments over a 30 minute period, holding the temperature between 70–95° C. After the final exotherm had subsided, the water-epichlorohydrin azeotrope was removed to a pot temperature of 120° C. The salts were removed by filtration and the excess epichlorohydrin distilled to a pot temperature of 150° C. at 40 mm. The product 670 g. (100% yield) had a weight per epoxide of 280 (theoretical 217), total chlorine 3.0%, active chlorine, 1.1%.

The preceding detailed description and examples illustrate the process in which dihydric phenols are added to the chlorohydrin ethers of the alcohols before dehydrohalogenation in the presence of an excess of epichlorohydrin.

An alternative or modified process is one in which the dihydric phenol is replaced, in whole or in part, with chlorohydrin or glycidyl-chlorohydrin ethers of dihydric phenols which will be subjected to dehydrohalogenation in the presence of an excess of epichlorohydrin at the same time that the chlorohydrin ethers of the alcohols are subjected to dehydrohalogenation.

When such chlorohydrin ethers of dihydric phenols are used, the process is a two-step process in the sense that the dihydric phenols are first reacted with epichlorohydrin in the presence of a catalyst to form chlorohydrin derivatives, and particularly glycidyl-chlorohydrin derivatives, of the dihydric phenol; and this is then added to or admixed with the chlorohydrin ether of the alcohol and subjected to dehydrohalogenation in the presence of excess epichlorohydrin.

Where the dihydric phenol is replaced only in part by the chlorohydrin ether of the dihydric phenol, the reaction will be somewhat more complex in the sense that part of the excess epichlorohydrin will react with the dihydric phenol during the dehydrohalogenation, while the chlorohydrin ethers of both the alcohol and dihydric phenol are dehydrohalogenated.

Whether the dihydric phenol is used alone, as in the preceding examples, or is replaced in whole or in part by a chlorohydrin ether, as illustrated in the following examples, the products are composite glycidyl ether compositions containing glycidyl ethers of both the aliphatic alcohol and the polyhydric phenol.

Particularly advantageous products are those produced from dichlorohydrin ethers of polyhydric alcohols and dihydric phenols or chlorohydrin derivatives of dihydric phenols. The resulting products are made up largely of glycidyl ethers of dihydric alcohols and of dihydric phenols. The use of an excess of epichlorohydrin during the dehydrohalogenation tends to promote the formation of products which are largely monomeric in character, but somewhat more complex reactions take place giving to some extent more complex reaction products than the simple diglycide ethers.

When the dihydric phenol is replaced, in whole or in part, by chlorohydrin ethers of dihydric phenols, similar proportions can be used of the chlorohydrin ether, or of the mixture of dihydric phenol and chlorohydrin ether, to those used when the dihydric phenol is used alone, as previously described.

The glycidyl-chlorohydrin ethers of dihydric phenols, which are advantageously used to replace the dihydric phenols, in whole or in part, have the following general formula:

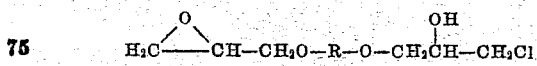

wherein R is the residue of the dihydric phenol. Such glycidyl-chlorohydrin ethers can readily be prepared, as illustrated in the following examples, by the reaction of epichlorohydrin on the dihydric phenol in the presence of a suitable catalyst.

When such glycidyl-chlorohydrin ethers are used in the process, the process is in effect a three-step process, one step being the production of the chlorohydrin ethers of the aliphatic alcohols, one step being the production of the glycidyl-chlorohydrin ethers of the dihydric phenols, and the third step being the dehydrohalogenation carried out in the presence of an excess of epichlorohydrin.

The use of chlorohydrin ethers of dihydric phenols, instead of or in addition to dihydric phenols, is illustrated by the following examples:

EXAMPLE 7

In this example, the dihydric phenol is replaced by the glycidyl-chlorohydrin ether which is first formed and admixed with the dichlorohydrin ether of the alcohol before dehydrohalogenation.

The process in this case is, in effect, a 3-step process.

The first step of the process is the preparation of the dichlorohydrin of ethylene glycol, as described in the first paragraph of Example 1.

The second step is the production of the glycidyl-chlorohydrin ether of bisphenol, which is illustrated by the following description:

To a 2 liter flask equipped with stirrer, thermometer, and reflux condenser was added 10 mols of epichlorohydrin (925 g.), 1 mol of bisphenol (228 g.) and 2 cc. of a 60% solution of benzyl trimethyl ammonium chloride in water. This solution was heated with stirring to 110° C. where a slight exotherm was encountered. Heat was removed and the exothermic temperature was allowed to rise to 114° C. After about five minutes the temperature began to subside, whereupon heat was applied to raise the temperature to reflux (118–122° C. pot temp.) After 3 hours heating at reflux, vacuum was applied to distill the unreacted epichlorohydrin and glyceryl dichlorohydrin to a pot temperature of 150° C. at 0.1–0.5 mm. Hg. The resinous product (365 g.) had a weight/epoxide of 323 and percent Cl of 7.3.

The third or final step of the process is illustrated by the following description:

To a 2 liter flask equipped with stirrer, condenser, and thermometer was added 247 g. (1 mol) of the dichlorohydrin ether of ethylene glycol described in step 1 and 1 g. NaOH dissolved in 5 cc. $H_2O$ to complex the $BF_3$ catalyst. To this was added 182.5 g. (½ mol) of the mixed glycidyl ether, chlorohydrin ether of bisphenol described in step 2. 555 grams (6 mols) of epichlorohydrin was added. When solution was attained 104.5 g. NaOH (2.62 mols), equivalent to the chlorine content of the chlorohydrin of the glycol and phenol plus 10% excess, was added in three increments. The temperature was controlled between 70–98° C. during these additions. After the final exotherm, the water-epichlorohydrin azeotrope was removed to a pot temperature of 125° C. The salt was removed by vacuum filtration and washed with benzene. The solvents were removed from the filtrate by vacuum distillation to a pot temperature of 150° C. at 40 mm. The product, in 100% yield (345 g.) had a weight/epoxide of 170 (theoretical 115), total chlorine 5.2%, active chlorine 1.2%, Gardner Viscosity M.

EXAMPLE 8

The first step of the process is the same as that of the preceding example and of Example 1. The second step of the process is the same as that of Example 7, except for the omission of the removal of the unreacted epichlorohydrin and glycerol dichlorohydrin by vacuum distillation. These are left in the product and added with it in carrying out the third step. The third step of the process is carried out as follows:

To a 2 liter flask, equipped as described before, was added 247 g. (1 mol) of the dicholohydrin ether of ethylene glycol described in step 1 and 1 g. NaOH dissolved in 5 cc. $H_2O$ to complex the $BF_3$ catalyst. To this was added 577 g. of the solution described in step 2. This solution would contain ½ mol of the mixed chlorohydrin ether, glycidyl ether of bisphenol, of the same analysis as in Example 1 plus glyceryl dichlorohydrin equivalent to the glycidyl ether portion of bisphenol and unreacted epichlorohydrin, the total mols of glyceryl dichlorohydrin and free epichlorohydrin being 4. 185 g. additional epichlorohydrin was added. When solution was attained 132 g. of NaOH (3 mols+10% excess), equivalent to the chlorine of the chlorohydrin ether of the glycol plus the chlorine of the chlorohydrin ether portion of the bisphenol and of the glyceryl dichlorohydrin, was added in 3 increments. The temperature was controlled between 70–90° C. during the caustic additions. After the final exotherm, the water-epichlorohydrin azeotrope was removed to a pot temperature of 125° C. The salt was removed by vacuum filtration and washed with benzene. The solvents were distilled from the filtrate by vacuum distillation to a pot temperature of 150° C. at 40 mm. The product in 100% yield (342 g.) had a weight/epoxide of 168 (theoretical 115), total chlorine 5.3%, active chlorine 1.3%, Gardner Viscosity M.

EXAMPLE 9

The first step of this example is the preparation of the dichlorohydrin ether of trimethylol propane as described in the first paragraph of Example 5.

The second step is the production of the glycidylchlorohydrin ether of bisphenol, which is the same as the second step of Example 7 above.

The third step in this case is one in which the products of the first two steps are admixed with each other and with added dihydric phenol and subjected to dehydrohalogenation in the presence of excess epichlorohydrin and is illustrated by the following description:

To a 2 liter flask equipped with stirrer, condenser, and thermometer was added 148 g. (0.465 mol) of the dichlorohydrin ether of trimethylol propane and 0.5 g. NaOH in 2 cc. $H_2O$ to complex the $BF_3$ catalyst. To this was added 114 g. (0.5 mol) of bisphenol, 182.5 g. (0.5 mol) of the glycidyl, chlorohydrin ether of bisphenol and 810 g. (8.79 mols) epichlorohydrin. After solution was attained 101 g. NaOH (2.525 mols-equivalence+10% excess) was added in 3 increments, temperature being controlled between 70–98° C. during these additions. (The caustic equivalence is calculated as the caustic necessary to react with the chlorine of the chlorohydrin ether of the aliphatic polyol, the chlorine of the glycidyl ether, chlorohydrin ether of bisphenol, and caustic equivalent to the phenolic hydroxyls of the added bisphenol.) After the final exotherm, the water, epichlorohydrin azeotrope was removed to a pot temperature of 125° C. The salt was removed by vacuum filtration and washed with benzene. The solvents were distilled to a pot temperature of 150° C. at 40 mm. The product in 100% yield (463 g.) had a weight/epoxide of 200 (theoretical 153) total Cl 2.2%, active Cl 1.0%, Gardner Viscosity $Z_3$.

EXAMPLE 10

The first step of the process is the same as that of Example 9 and Example 5. The second step of the process is the same as that of Example 8.

The products of these steps are admixed with each other and with added dihydric phenol and subjected to dehydrohalogenation in the presence of excess epichlorohydrin, in accordance with the following description:

To a 2 liter flask equipped as before was added 148 g. (0.465 mol) of the dichlorohydrin ether of trimethylol propane and 0.5 g. NaOH dissolved in 2 cc. $H_2O$ to complex the $BF_3$ catalyst. To this was added 114 g. (0.5 mols) of bisphenol, 577 g. of the solution described in step 2. This solution would contain 0.5 mol of the mixed glycidyl, chlorohydrin ethers of bisphenol of the same analysis as described in step 2 of Example 7 plus glyceryl dichlorohydrin equivalent to the glycidyl ether portion of the aforementioned molecule and unreacted epichlorohydrin. Additional epichlorohydrin (416 g., 4.5 mols) was added. When solution was attained 129 g. NaOH (3.225 mols, equivalence+10% excess) was added in 3 increments, the temperature being controlled between 70–98° C. during these additions. The NaOH equivalence is described as the caustic necessary to react with the chlorine of the dichlorohydrin present, and sufficient NaOH to react with the phenolic hydroxyls of the added bisphenol. The product was worked up in the same manner as described in previous examples. The resinous product in 100% yield (464 g.) had a weight/epoxide of 199 (theoretical 153), total chlorine 2.1%, active chlorine 0.8%, Gardner Viscosity $Z_3$.

The products above described and illustrated in the examples and table can be cured with amine catalysts such as diethylene triamine or metaphenylene diamine, e.g., using amounts equivalent to the epoxide content of the resin. These resins can be used for purposes for which epoxide resins are useful. Products containing a small proportion, e.g., 25% or less of the aliphatic diglycide ether, have the advantage, when cured, of incorporating this aliphatic component with the aromatic components of the epoxides produced from the polyhydric phenols.

We claim:

1. The method of producing composite glycidyl ethers of aliphatic alcohols and phenols which comprises forming a mixture of a chlorohydrin ether of an alcohol, a phenol, and an excess of epichlorohydrin, and subjecting the mixture to a dehydrohalogenation reaction with an alkaline dehydrohalogenating agent, the amount of alkaline dehydrohalogenating agent being sufficient to effect dehydrohalogenation of the chlorohydrin ether and reaction of part of the excess epichlorohydrin with the phenol, and the amount of excess epichlorohydrin being equivalent to at least one mole of epichlorohydrin for each mole of epichlorohydrin residue present in the glycidyl ethers of both the aliphatic alcohols and phenols.

2. The method of producing composite polyglycidyl ethers of aliphatic polyhydric alcohols and polyhydric phenols which comprises forming a mixture of a polychlorohydrin ether of a polyhydric alcohol, a polyhydric phenol, and an excess of epichlorohydrin, and subjecting the mixture to a dehydrohalogenation reaction with an alkaline dehydrohalogenating agent, the amount of alkaline dehydrohalogenating agent being sufficient to effect dehydrohalogenation of the polychlorohydrin ethers and reaction of part of the excess epichlorohydrin with the polyhydric phenol, and the amount of excess epichlorohydrin being equivalent to at least one mole of epichlorohydrin for each mole of epichlorohydrin residue present in the glycidyl ethers of both the aliphatic alcohols and phenols.

3. The method of producing composite diglycidyl ethers of aliphatic dihydric alcohols and dihydric phenols which comprises forming a mixture of a dichlorohydrin ether of a dihydric alcohol, an excess of epichlorohydrin, and a dihydric phenol compound selected from the group consisting of a dihydric phenol, a chlorohydrin ether of a dihydric phenol and mixtures thereof, and subjecting the mixture to a dehydrohalogenation reaction with an alkaline dehydrohalogenating agent, the excess of epichlorohydrin serving as a solvent and reaction medium, and the amount of excess epichlorohydrin being equivalent to at least one mole of epichlorohydrin for each mole of epichlorohydrin residue present in the glycidyl ethers of both the aliphatic alcohols and phenols.

4. Composite glycidyl ethers produced according to the process of claim 1.

5. Composite polyglycidyl ethers produced in accordance with the process of claim 2.

6. Composite diglycidyl ethers produced in accordance with the process of claim 3.

References Cited in the file of this patent

UNITED STATES PATENTS 2,581,464    Zech ------------------ Jan. 8, 1952

UNITED STATES PATENT OFFICE
CERTIFICATION OF CORRECTION

Patent No. 3,033,816                      May 8, 1962

Herbert P. Price et al.

It is hereby certified that error appears in the above numbered patent requiring correction and that the said Letters Patent should read as corrected below.

In the grant, lines 1 to 3, for "Herbert P. Price and William J. Belanger, of Louisville, Kentucky," read -- Herbert P. Price and William J. Belanger, of Louisville, Kentucky, assignors to Devoe & Raynolds Company, Inc., of Louisville, Kentucky, a corporation of New York, --; line 12, for "Herbert P. Price and William J. Belanger, their heirs" read -- Devoe & Raynolds Company, Inc., its successors --; in the heading to the printed specification, lines 4 and 5, for "Herbert P. Price and William J. Belanger, both % Devoe & Raynolds Company, P. O. Box 328, Louisville 1, Ky." read -- Herbert P. Price and William J. Belanger, Louisville, Ky., assignors to Devoe & Raynolds Company, Inc., Louisville, Ky., a corporation of New York --; column 3, line 16, for "salt" read -- salts --; column 9, lines 30 and 31, for "epichiorohydrin" read -- epichlorohydrin --; column 10, line 1, for "dicholohydrin" read -- dichlorohydrin --.

Signed and sealed this 11th day of September 1962.

(SEAL)
Attest:

ERNEST W. SWIDER                            DAVID L. LADD

Attesting Officer                               Commissioner of Patents